April 20, 1954     R. G. EDGAR     2,675,706

SAMPLING AND GAUGING DEVICE

Filed March 13, 1951

INVENTOR.
ROBERT G. EDGAR
BY
Edward H. Lang
ATTORNEY

Patented Apr. 20, 1954

2,675,706

UNITED STATES PATENT OFFICE

2,675,706

SAMPLING AND GAUGING DEVICE

Robert G. Edgar, Toledo, Ohio, assignor to The Pure Oil Company, Chicago, Ill., a corporation of Ohio Application March 13, 1951, Serial No. 215,223

8 Claims. (Cl. 73—421)

This invention relates in general to an apparatus for taking liquid samples from storage tanks and the like, and more particularly to a device for taking a representative sample of oil from oil storage tanks.

The primary object of this invention therefore is to provide an oil sampling device which will yield a representative sample of the oil regardless of the amount of oil in the tank at the time of sampling.

Figure 1:
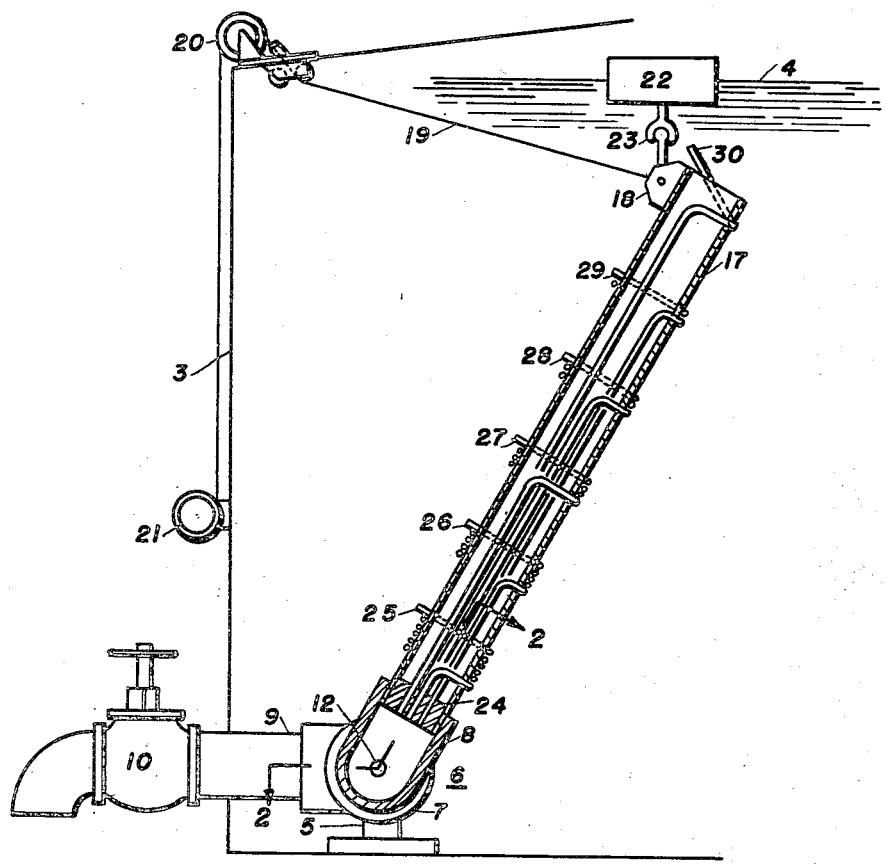
Figure 2:
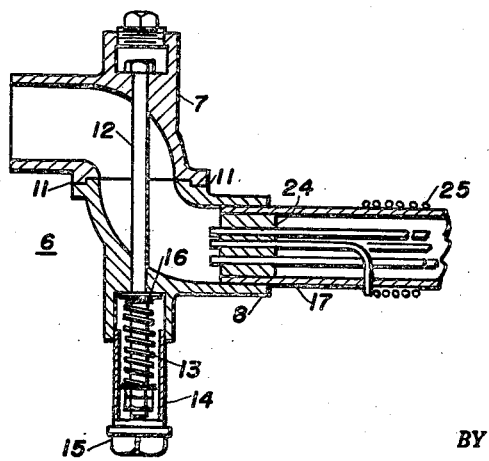

The invention is best explained by reference to the attached drawings wherein Figure 1 is a part-sectional elevational view of a sampling and gauging device constructed according to this invention and attached to an oil storage tank filled with oil. Figure 2 is a cross-sectional view taken along line 2—2 in Figure 1 with the apparatus in horizontal position.

Referring to the drawings the numeral 3 represents a tank or other liquid-containing vessel having a variable liquid level represented at 4. 5 is a supporting member designed to carry the substantial portion of the weight of the sampling apparatus on the tank floor. Support 5 attaches to a swing joint 6 which is made up of a stationary elbow 7 and a pivotal elbow 8. Stationary elbow 7 connects through pipe 9 to valve 10 located outside the tank 3. Stationary elbow 7 and pivotal elbow 8 have closely fitting opposed surfaces which form both a liquid seal and bearing surface, allowing pivotal elbow 8 to swing in an arc of 90° or more. This surface is shown in Figure 2 at 11. Stationary elbow 7 and pivotal elbow 8 are held together at surface 11 by means of rod 12 which passes through holes in the outside walls of both elbows. Spring 13 provides the necessary tension to maintain surfaces 11 in liquid-sealing contact with each other. Pipe 14 and cap 15 serve as a housing for spring 13 and necessary bushing or bearing 16 to further insure a liquid seal. Swing joint 6 thereby serves both as a pivotal support means and to form a manifold to receive and convey liquid into pipe 9.

Fitted within the rotating leg of elbow 8 is support 17 which becomes an integral part thereof and is thus free to rotate in an arc of 90° or more in a vertical plane. The free end of support 17 has ring 18 to which is attached line 19 running to pulley 20 outside the tank and to reel 21. Float 22 is also attached through knuckle 23 to the free end of support 17 and gives the pivoting portion of the apparatus sufficient buoyancy, as it rides on liquid level 4, to at all times maintain support 17 within the liquid of the tank. Any rise or fall of the liquid level is thereby registered on reel 21 through line 19. Reel 21 may be calibrated to show the relative position of the float 22 and support 17 within the tank or to show the depth in feet of liquid in the tank. This latter value may be transposed into gallons from knowledge of the internal dimensions of the tank.

Tightly fitted within the lower end of support 17 is seal 24 serving to seal off the inner part of support 17 from the inner or manifold part of pivotal elbow 8 and also support the lower termini or outlets of a plurality of sampling tubes represented at their inlets by the numerals 25, 26, 27, 28, 29 and 30. Sampling tubes 25–30 each have inlets on the upper side of support 17 and outlets into pivotal elbow 8. The lower termini or outlets are reasonably close to the axis of rotation of pivotal elbow 8 so that as support 17 rises or falls with a change in liquid level 4 the relative distance of these lower termini or outlets from the tank floor will not be changed substantially. The plurality of sampling tubes 25–30 are bundled through seal 24 so that each lower outlet is as near as possible to a common point within pivotal elbow 8. Support 17 is open at its upper end to the liquid in the tank to overcome any buoyancy due to entrapped air in the inside thereof.

Sampling tubes 25–30 are all of equal length or substantially so, and have equal uniform inside diameters. Each of the inlets is fitted with a screen (not shown) to prevent plugging from any sediment or insolubles in the liquid in the tank. These sampling tubes have their inlets so spaced along support 17 that a representative sample may be withdrawn by the apparatus. For this purpose it is preferred that the inlets be equidistant from each other and arranged so that the topmost inlet 30 is near the top free surface of the liquid and the bottom inlet 25 is near the lowest level to which the liquid is allowed to fall during normal usage. By this arrangement when support 17 is in a vertical position (tank full), the top inlet 30 will be near the liquid level 4 and the bottom inlet 25 will be about the same distance from the bottom of the tank. Also when support 17 is in substantially a horizontal position (tank substantially empty) the spaced relationship of inlet 30 and liquid level 4 or inlet 25 and the tank bottom will not have changed appreciably. This will assure the extraction of representative liquid samples from the tank at plurality of points therein. The excess length of all but the topmost tube over that necessary to reach the equidistant points along support 17 is compensated for by wrapping the excess length around the outer surface of support 17. Support 17 is preferably cylindrical so that the coils thus made in the tubes 25–30 are of uniform curvature and have no sharp corners to increase the resistance to liquid flow.

When it is desired to obtain a representative sample from a tank fitted with the apparatus just described, all that is necessary is to open valve 10, allow the liquid to flow into each sampling tube with time given to drain any entrapped liquid from previous samplings, and collect the sample at valve 10. Since each tube is of the same diameter and the same length, they will each deliver the same quantity of liquid into the manifold of swivel joint 6 in a given length of time. This will be true as long as the inlet of each tube 25–30 is within the body of the liquid and only gravitational forces are acting on the system. The inside diameter of the sampling tubes is made small as compared with the diameter and volume of the swivel joint 6 so that on opening valve 10 the effect is to create a zero external pressure (atmospheric) differential between the top surface of the liquid and the inside of swivel joint 6 at the termini of the sampling tubes therein, thus assuring that substantially the only force acting on the liquid is the force of gravity. All parts in contact with the flowing liquid are designed to offer the least resistance to liquid flow. Thus the above described apparatus will operate to give a representative sample, and will follow the natural law of hydraulics.

A specific example of a sampling and gauging device for a tank 30' high would comprise eight pieces of aluminum tubing ⅛" in inside diameter and 30' long. These tubes would be placed at four foot intervals along a supporting member and their lower outlets would empty into a ¾" pipe manifold on a swing joint at the bottom of the tank.

The sampling apparatus has been described by specific reference to Figures 1 and 2. It is to be understood, however, that the embodiments shown in these drawings are not intended as limitations upon the invention. For example, the valve 10 may be any means for controlling the flow of liquid through pipe or conduit 9. Likewise, swing joint 6 which has been shown as a particular type of swing joint comprising two pivotal elbows, may be any means which provides both a manifold into which the plurality of sampling tube outlets terminate and means for pivotably mounting a support for the plurality of sampling tubes. One such swing joint is the type manufactured by The Vapor Recovery Systems Company under United States Patent 2,150,583. Also pipe 9 and the lower outlets of the plurality of sampling tubes could be connected by a flexible coupling or a rubber hose designed to swing in an arc of 90° or more without pinching or otherwise lessening the volume of the manifold created thereby. The support 17 is shown as a hollow cylindrical arm through the aperture of which the sampling tubes pass. The invention is not limited to this arrangement and support 17 may take the form of any means which serves the purpose of supporting a plurality of sampling tubes so that their upper inlets may be spaced along the length of support and no point in any portion of the tubes is restricted to liquid flow. One possible arrangement of support and sampling tubes may be obtained by providing the sampling tubes which are sufficiently rigid to support themselves, and either coiling them around each other or providing spaced U bends in each tube to take up the excess length thereof. By this arrangement the sampling tube having its inlet close to the manifold will have the longest U-portion. Referring to seal 24 in the lower end of support 17, this seal may take the form of a plastic cylinder in which the bundle of sampling tubes has been molded to form a liquid tight fit. The seal may be press fitted into support 17. Another arrangement would be to weld or solder the ends of the tubes into holes in a perforated plate (not shown), which may be screwed or press fitted into support 17.

It is preferred that the sampling tubes be constructed of a metal which is not affected by the liquid to be sampled and also that the metal lends itself to formation into the coil or U tube arrangement described. For this purpose aluminum tubing has been found practical. The arrangement of line 19, pulley 20 and reel 21 may be in form of combination of parts which serves the purpose of giving an indication of the relative position of the sampling device within the vessel containing the liquid to be sampled. If desired manifold or swing joint 6 may be fitted with a separate conduit to supply air pressure thereto from an outside source for the purpose of blowing out the tubes before sampling to insure that the tubes and their inlets are clear.

The sampling apparatus has application in taking representative samples from liquids which are homogeneous as well as those which become heterogeneous upon storage or any period of quiescence. With homogeneous liquids the most acceptable technique is to remove samples from various portions of the liquid in order to assure a representative sample. The present sampling device is especially adapted for such sampling techniques. The invention will therefore apply to liquids which are substantially homogeneous and liquids containing ingredients tending to separate into layers or stratify. In general, it will be found that liquids having this tendency to stratify will separate into layers having slightly different densities from adjacent layers. This is particularly true of crude petroleum and fractions thereof which may separate into a top oil layer, an intermediate emulsion layer and a bottom aqueous layer. By employing a sufficient number of sampling tubes, equally spaced throughout the liquid, a representative sample will be obtained from any such a multicomponent liquid system.

In explaining that the present apparatus follows the basic principles of hydraulics, the assumption has been made that the liquid flowing from the top, intermediate and bottom sampling tubes was of uniform density. Since the degree of density change within a heterogeneous liquid necessary to cause the liquid to stratify or form layers of different density is relatively small, any such density differences may be compensated for by variations in the internal volume of the sampling tubes which are in the lower, more dense strata. To obtain a representative sample of a liquid like crude oil, where the density changes between layers are minute, such variation of the volume of the lower tubing is unnecessary.

What is claimed is:

1. A gravitational sampling device for vessels containing liquid comprising, a manifold located near the bottom of said vessel, a plurality of substantially equal efflux capacity, open-ended sampling tubes having their lower ends connected to said manifold and pivotally mounted adjacent said lower ends and their upper ends in open communication with liquid in said vessel at representative points above said manifold, said manifold being sealed against communication with the inside of said vessel except through said tubes, means for swinging said tubes about their pivotal mountings, and means for discharging liquid from said manifold to a point outside of said vessel.

2. A gravitational sampling device for vessels containing liquid comprising, a manifold located near the bottom of said vessel, a plurality of substantially equal efflux capacity, open-ended sampling tubes having their lower ends connected to said manifold and pivotally mounted adjacent said lower ends and their upper ends in open communication with liquid in said vessel at representative points above said manifold, said manifold being sealed against communication with the inside said vessel except through said tubes, a liquid level responsive element supporting said tubes and allowing said tubes to swing about their pivotal mountings, and means for discharging liquid from said manifold to a point outside of said vessel.

3. A gravitational sampling device for vessels containing liquid comprising, a manifold located near the bottom of said vessel, a plurality of substantially equal efflux capacity, open-ended sampling tubes having their lower ends connected to said manifold and pivotally mounted adjacent said lower ends and their upper ends in open communication with liquid in said vessel at representative points above said manifold, said manifold being sealed against communication with the inside of said vessel except through said tubes, a float supporting said tubes and allowing said tubes to swing about their pivotal mountings, and means for discharging liquid from said manifold to a point outside of said vessel.

4. A gravitational sampling device for vessels containing liquid comprising, a manifold located near the bottom of said vessel, said manifold comprising a swing joint made up of a stationary portion and a pivotal portion, a plurality of substantially equal efflux capacity sampling tubes having one end rigidly connected to said pivotal portion and the other end in open communication with liquid in said vessel at representative points above said manifold, said manifold being sealed against communication with the inside of said vessel except through said tubes, means for swinging said tubes about the pivotal axis of said pivotal portion of said manifold, and means for discharging liquid from said manifold to a point outside of said vessel.

5. A gravitational sampling device for vessels containing liquid comprising, a manifold located near the bottom of said vessel, an elongated support element having one end attached to said manifold for pivotal movement adjacent said end, a plurality of equal efflux capacity, open-ended sampling tubes mounted on said support element, said tubes having their lower ends in open communication with the inside of said manifold and their upper ends ending at spaced points along said support element in open communication with liquid in said vessel, said manifold being sealed against communication with the inside of said vessel except through said tubes, means for swinging said support element about its pivotal mounting, and means for discharging liquid from said manifold to a point outside of said vessel.

6. A gravitational sampling device for vessels containing liquid comprising, a manifold located near the bottom of said vessel, said manifold comprising a swing joint made up of a stationary portion and a pivotal portion, an elongated support element having one end attached to said manifold for pivotal movement adjacent said end, a plurality of substantially equal efflux capacity sampling tubes rigidly connected to said support element, said sampling tubes having their lower outlets terminating in said manifold and their upper inlets in open communication with the liquid in said vessel at representative points above said manifold, said manifold being sealed against communication with the inside of said vessel except through said tubes, means for swinging said support about the pivotal axis of said pivotal portion of said manifold, and means for discharging liquid from said manifold to a point outside of said vessel.

7. A gravitational liquid sampling device for vessels containing liquid comprising a manifold located near the bottom of said vessel, said manifold comprising a swing joint made up of a stationary portion and a pivotal portion, a conduit leading from said stationary portion to an outlet outside of said vessel at a point not above said manifold, a plurality of substantially equal volume open-ended sampling tubes connected to said pivotal portion, said sampling tubes having their lower outlets terminating in said manifold and their upper inlets in open communication with liquid in said vessel at representative points above said manifold, said inlets being the only communication of said manifold with said liquid, means for opening and closing said conduit, and a float supporting said tubes and allowing said tubes to swing about the pivotal axis of said pivotal portion of said manifold.

8. A gravitational liquid sampling device for vessels containing liquid comprising a manifold located near the bottom of said vessel, said manifold comprising a swing joint made up of a stationary elbow, a pivotal elbow, and a spring-actuated rod passing in liquid sealed relationship through the pivotal axis of said stationary and pivotal elbows and holding said stationary and pivotal elbows together, a conduit leading from said stationary elbow to an outlet outside of said vessel at a point not above said manifold, a hollow supporting element attached to said pivotal elbow, a plurality of substantially equal length and equal inside diameter sampling tubes within said hollow supporting element and having their lower outlet ends communicating with the inside of said pivotal elbow at a point substantially close to said axis, a sealing means between the outside of said sampling tube outlets and the inside of said hollow supporting element, said sampling tubes having their inlet ends communicating with said liquid at a plurality of representative points along said supporting element, each tube being uniformly coiled around said support to take up the excess length thereof required to reach said representative point, a valve for opening and closing said conduit, and a float attached to said supporting element and adapted to ride on the surface of said liquid and maintain said inlet ends at predetermined points with respect to the surface of said liquid.

References Cited in the file of this patent
UNITED STATES PATENTS

| Number | Name | Date |
|---|---|---|
| 507,590 | Potschinsky | Oct. 31, 1893 |
| 712,699 | May | Nov. 4, 1902 |
| 2,020,529 | Thorsten | Nov. 12, 1935 |
| 2,030,682 | Campbell | Feb. 11, 1936 |
| 2,267,221 | Roney | Dec. 23, 1941 |
| 2,391,978 | Kahl | Jan. 1, 1946 |
| 2,534,181 | Roberts | Dec. 12, 1950 |